May 29, 1934.  H. SWAN ET AL  1,960,602
MATRIX
Filed July 6, 1929

INVENTOR.
H. Swan & S. Higgins
BY Jos. N. Nielsen
ATTORNEYS.

Patented May 29, 1934

1,960,602

UNITED STATES PATENT OFFICE 1,960,602

MATRIX

Hylton Swan, Upper Montclair, and Sigfried Higgins, Verona, N. J., assignors to Bakelite Corporation, New York, N. Y., a corporation of Delaware Application July 6, 1929, Serial No. 376,486

10 Claims. (Cl. 41—25)

This invention relates to matrices for the manufacture of printing plates and the like and to methods of preparing them.

Phenolic resinoid compositions are particularly advantageous for the molding of printing plates on account of their strength, light weight, durability, fidelity in reproduction, etc., and for similar reasons they are highly desirable for the production of matrices from which printing plates are to be molded. These resinoid compositions are obtained by the addition of fillers, such as wood-flour, asbestos, blotting paper, etc. to phenolic resinoids, that is, condensation products which result from the reaction of a phenol and formaldehyde or their equivalents and which have the property of changing from an initial fusible or reactive condition to an infusible one upon the application of heat. However, resinoid compositions when used in making a matrix from a type body have a tendency to anchor in the interstices thereof, and furthermore in the molding of resinoid composition against a resinoid matrix to produce a printing plate, there is the difficulty of sticking or anchoring. Accordingly it is customary to face the matrix with a parting medium and the resinoid composition then becomes a backing.

In the procedure heretofore generally followed in the manufacture of matrices from phenolic compositions the parting medium or facing sheet that has been used comprises thin sheet lead, tin or other soft metal which is placed over the original printing plate, type form, cut, halftone etching or engraving to be reproduced. A heavy pressure is applied to the lead or other soft metal sheet through the medium of a yielding material, such as layers of paper, in order to force it into intimate contact with the original and obtain the requisite definition; pressures in the neighborhood of from 7,000 to 12,000 pounds to the square inch are usually found necessary, but the application of pressures of this magnitude are likely to cause injury to the original, particularly when it consists of or includes type matter. The metal facing sheet is thereupon backed with a reactive resinoid composition in sheet form, and heat and pressure are applied to cause the composition backing to fill the depressions made in the facing and simultaneously to first soften and then set the backing to the infusible condition. This method of open or flash type molding is subject to the disadvantage that the resinoid backing has a tendency to flow while in a softened condition along the lines of least resistance, that is, laterally of those portions of the facing that provide no obstructions, and to extrude at the unconfined edges with a loss of effective pressure and consequent non-uniform density in the backing. These defects become apparent when the matrix so prepared is used in the molding of printing plates for the matrix is found to yield at the edges and in those parts where the backing is of less density with the result that the molded printing plates have high edges and unevenness of printing surface.

We have discovered that a sheet of material comprising a cellulose xanthate or regenerated cellulose, furnishes an excellent facing material for matrices prepared from phenolic resinoid compositions. Matrices faced with this material have a very smooth, hard surface and a high finish. Furthermore, a number of printing plates can be molded from a phenolic resinoid composition against a single matrix without injuring the matrix surface and without requiring the addition of graphite or similar release materials. The selection of such a facing material moreover eliminates the application of the high initial pressures heretofore found necessary with the use of lead sheets, and the regenerated cellulose facing is shaped into conformity with the original type body or other matter being reproduced simultaneously with the molding of the phenolic resinoid backing which takes place under relatively low pressures of from 750 to 1,500 pounds to the square inch, depending upon the thickness and the condition of reactivity of the resinoid composition, the character of the original, etc. The possibility of such a combined operation may be ascribed to the remarkable property of stretching which regenerated cellulose is found to possess, and which therefore permits the molding of type forms having considerable depth.

As a further improvement we have found that sharper and more uniform definition can be had by applying the backing material to a facing or parting medium in the form of a powder instead of in the sheet form as heretofore, provided the material be confined within a positive mold. Pressure applied to a powdered material so confined approaches the hydro-static condition, more particularly during the heating which is applied simultaneously with the pressure and which causes the resinoid composition to fuse preliminarily to its setting to the infusible condition. The full effect of the pressure is thereby imparted to the facing sheet which insures a uniform and sharp definition, and as the flow is practically restricted to the direction of applied pressure substantially uniform density is likewise obtained. In addition positive molding permits marked reductions in pressure.

In the accompanying drawing

Figure 1:
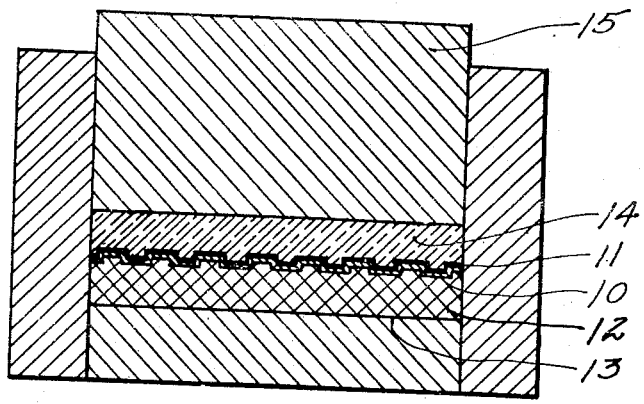
Fig. 1 is a vertical cross section of a mold and assembled elements.
Figure 2:
Fig. 2 is a vertical cross section of a completed matrix.

In the preparation of a matrix in accordance with this invention a sheet 10 of regenerated cellulose is first prepared by roughening, such as sanding or sand-blasting one side of the sheet. A cementing mixture 11, for example, one made of about equal parts of furfural and glycerine, is preferably applied as a thin coating to the roughened surface. The furfural and glycerine mixture is a softener for both the resinoid and the regenerated cellulose. Furfural is also chemically reactive with the resinoid. The type form or other original matter 12 being reproduced is placed within a mold cavity 13 of suitable size and the prepared regenerated cellulose is placed thereon with its smooth surface in contact with the original. One or more resinoid-impregnated paper sheets in reactive condition can be placed over the regenerated cellulose if desired. A reactive phenolic resinoid molding material 14 preferably in the form of a powder is then spread over the regenerated cellulose or impregnated paper sheet as a backing and pressure is applied by a force or plunger 15, which fits the mold cavity and compresses the molding material; pressures of from 500 to 750 pounds are found to suffice for molding matrices from type matter. At the same time heat is applied to the mold elements in the usual manner at a temperature of about 150° C. to first soften the backing material and then to cause it to set to the infusible condition. The coating of furfural and glycerine applied to the regenerated cellulose insures the bonding of the regenerated cellulose to the molded resinoid backing.

The thickness of a regenerated cellulose sheet found satisfactory for this purpose approximates .002 to .010 inches. Where there is considerable variation in depth as in type faces, somewhat thicker sheets may be used.

Prior to placing sheet regenerated cellulose over the metal original in the mold it is sometimes found advantageous to moisten it as over a steam jet or otherwise. In this condition it stretches more readily to contact all parts of the original.

After the molding operation is completed the metal original and the matrix attached to it are removed from the mold and the original is then separated from the matrix. The matrix is now in a cured or polymerized condition and can be used in the same manner as other matrices for the manufacture of composition printing plates.

We claim:

1. Matrix suitable for the preparation of printing plates comprising a molded phenolic resinoid composition having a contact surface of regenerated cellulose secured thereto by a cement including furfural and glycerine.

2. Matrix suitable for the preparation of printing plates comprising a phenolic resinoid composition body having a contact surface of regenerated cellulose secured to the body.

3. Matrix suitable for the preparation of printing plates having a body and a contact surface of regenerated cellulose secured to said body through the medium of a cement containing a softening agent for the body and for the cellulose.

4. Article of manufacture comprising a body of resinoid composition, a facing of regenerated cellulose for said body, and a cement including furfural and gylcerine for bonding the facing to the body.

5. Article of manufacture comprising a body of resinoid composition, and a facing of regenerated cellulose secured to said body.

6. Method of preparing a matrix from an original which comprises roughening one side of a sheet of regenerated cellulose, applying a cement to the roughened surface of the sheet, placing the sheet on the original with its smooth side in contact, contacting the roughened surface of the sheet with a resinoid composition in reactive condition, and applying heat and pressure to the assembly to simultaneously conform the sheet to the contour of the original and set the resinoid composition.

7. Method of preparing a matrix from an original which comprises applying a sheet of regenerated cellulose to the original, placing a reactive resinoid composition in contact with the sheet, and applying heat and pressure to the assembly to simultaneously conform the sheet to the contour of the original and set the resinoid composition.

8. Matrix suitable for the preparation of printing plates having a body and a contact surface of regenerated cellulose secured to said body by a cement containing an ingredient which is a softener for the regenerated cellulose.

9. Matrix suitable for the preparation of printing plates having a body and a contact surface of regenerated cellulose secured to said body by a cement containing an ingredient which is a softener for the body.

10. Matrix suitable for the preparation of printing plates having a body and a contact surface of regenerated cellulose secured to said body by a cement containing an ingredient which is chemically reactive with the body.

HYLTON SWAN.
SIGFRIED HIGGINS.